United States Patent [19]
Liddall

[11] 3,888,282
[45] June 10, 1975

[54] SERVICE COLUMNS

[75] Inventor: Jack Anthony Liddall, Mississauga, Ontario, Canada

[73] Assignee: Linac Systems International Ltd., Agincourt, Ontario, Canada

[22] Filed: July 16, 1973

[21] Appl. No.: 379,592

[30] Foreign Application Priority Data
Nov. 28, 1972 United Kingdom............... 55011/72

[52] U.S. Cl. ................ 138/106; 138/107; 174/101; 52/122
[51] Int. Cl. .......... F16l 3/02; F16l 3/10; F16l 3/12
[58] Field of Search .......... 138/103, 106, 111, 115, 138/118, 156, 157, 158, 107; 174/97, 101; 52/220, 221, 727, 731, 243, 236, 264, 122; 248/300, 188.9

[56] References Cited
UNITED STATES PATENTS

| 775,562 | 11/1904 | Golliek | 138/157 X |
| 2,543,122 | 2/1951 | Mortenson | 52/264 |
| 2,730,209 | 1/1956 | Larsen | 52/264 |
| 2,808,135 | 10/1957 | Moran | 138/157 |
| 2,963,131 | 12/1960 | Brockway | 52/731 |

FOREIGN PATENTS OR APPLICATIONS

| 302,417 | 6/1964 | Netherlands | 52/731 |

*Primary Examiner*—Henry K. Artis
*Assistant Examiner*—James E. Bryant, III
*Attorney, Agent, or Firm*—Ridout & Maybee

[57] ABSTRACT

There is provided, in combination, a service column, and a securement device releasably mounting of the service column, the service column having a core which may in cross-section be in the form of two members each of which is of approximately U-shape in cross-section and which are disposed in back-to-back relationship with web portions of said members rigidly interconnected, or which may be alternatively be of approximately X-shape in cross-section. The core thus has a plurality of longitudinally extending service channels which are adapted to be covered by removably mounted, longitudinally extending side cover strips of a resiliently deformable plastics material. In one embodiment of the invention the securement device, which securely embraces the column transversely thereof without overlying one of the service channels, comprises a substantially U-shaped clamping member having two spaced limbs the free end portion of one of which is engageable with the core of the service column at a lateral extremity of the above-mentioned one of the service channels and the other of which is provided with a screw-threaded member which is in engagement with a recess provided in the core of the service column, whereby the clamping member securely embraces the column. In an alternative embodiment the securement device comprises a pair of clamping arms one end of each of which is in engagement with the core of the service column at a lateral extremity of the above-mentioned one of the service channels, the other end portions of the clamping arms being securely interconnectible securely embracing the column transversely by said arms. In each embodiment the securement device is securely connectible to a main or cross beam of a false ceiling. Thus, with the appropriate side cover strip removed cables and wiring connected, or to be connected, to service facilities such as electrical power outlets, telephone connections, and other communications equipment mounted on the service column may readily be "laid-in" to the above-mentioned one of the service channels, thereby eliminating any need for the cables and wiring to be fed-in to this service channel by an inconvenient and time-consuming "threading" operation.

14 Claims, 11 Drawing Figures

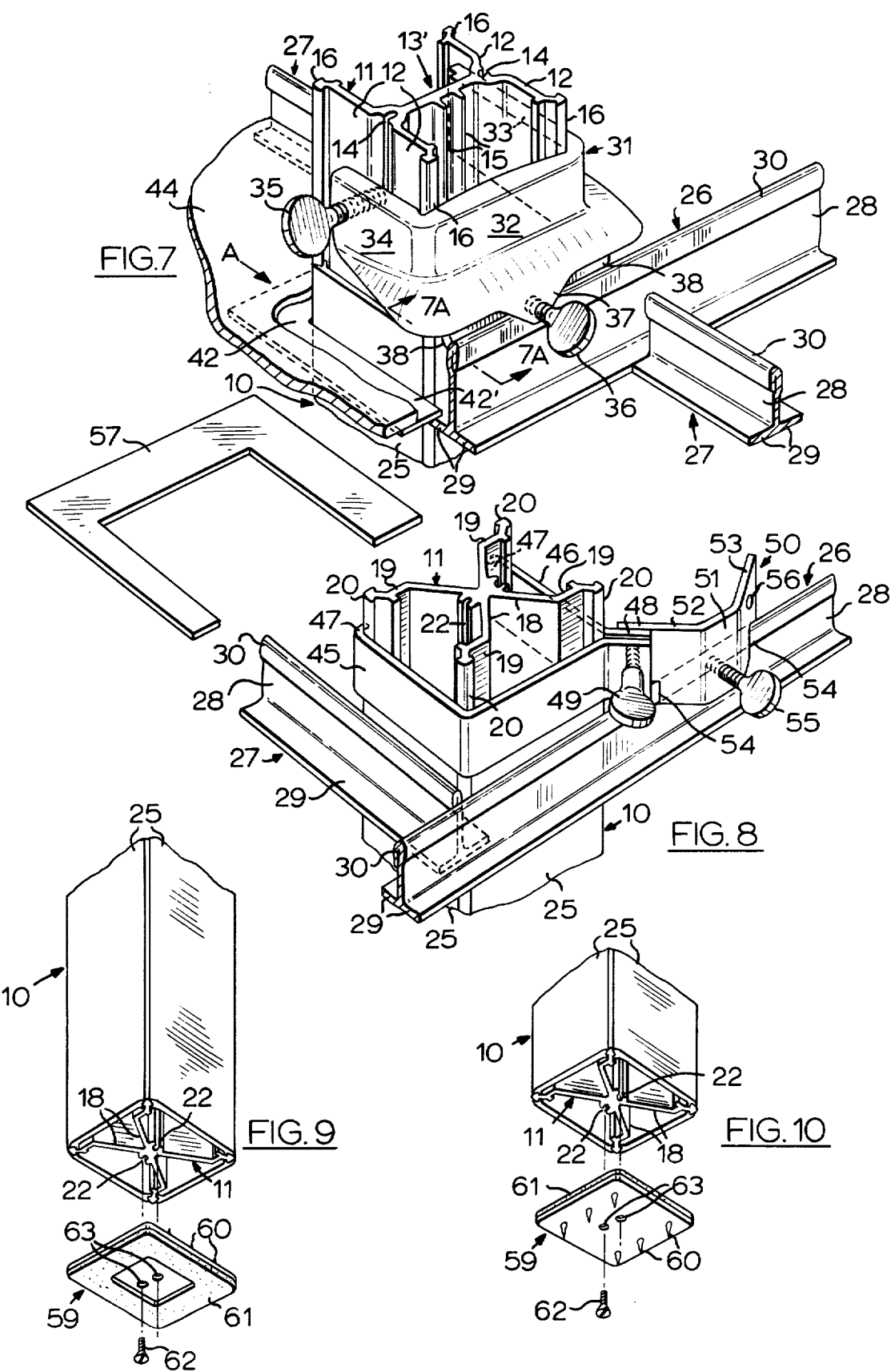

SERVICE COLUMNS

This invention is concerned with improvement relating to service columns, such columns being used particularly in commercial office accommodation for permitting such service facilities as electrical power outlets, telephone connections, and other communications equipment to be positioned at the desired locations within the office accommodation. Each service column is operatively disposed substantially vertically between the ceiling and floor at the appropriate location within the office accommodation, the column being releasably mounted to a ceiling structure which may be constituted, where the ceiling is in the form of a false ceiling comprising of a grid of interconnected main and cross beams each of which is of inverted approximately T-shape in cross-section with ceiling panels and lighting units disposed between the beams in supported relationship therewith, by one of these beams. The service facilities such as the electrical power outlets, the telephone connections, and the other communications equipment are mounted on the column with the associated cables and wiring which are connected to these facilities being disposed longitudinally through the column and being connected to appropriate junction boxes or the like mounted at conveniently located positions in the space above the false ceiling.

It is a primary advantage of the use of such service columns that they provide considerable versatility in that the locations thereof within office accommodation may readily be changed to accommodate, for example, desired changes in the layout of any particular office accommodation. For this reason such service columns are particularly suitable for use in office accommodation which is arranged on the so-called "open-plan" principle.

It has, however, been a disadvantage of such service columns as hitherto used that when the columns are mounted to the associated ceiling structures it is necessary, because of the form of the securement device by which each column is so mounted to the associated ceiling structure, to feed-in the cables and wiring which are to be disposed within the column by a "threading" operation when these cables and wiring are being installed either initially or to provide additional or replacement service facilities in a previously installed column. This "threading" operation is inconvenient and time-consuming and seriously detracts from the versatility of the column which, as herein before stated, constitutes a primary advantage of the use of such a column. It is accordingly a primary object of the present invention to provide, in combination, a service column and a securement device releasably mounting the service column to a ceiling structure, in which the above disadvantage is substantially obviated by eliminating the need for the cables and wiring which are to be disposed within the column being fed-in by a "threading" operation.

According to the present invention there is provided, in combination, a service column, a ceiling structure and a securement device releasably mounting the service column to the ceiling structure, wherein the service column comprises a core provided with a longitudinally extending service channel having a longitudinally extending open face, and a removable cover mounted on said open face, and the securement device securely embraces the column transversely thereof without overlying said service channel, the securement device being connected to the ceiling structure.

The securement device preferably comprises a substantially U-shaped clamping member having two spaced limbs the free end portion of one of which is in engagement with the core of the service column at a lateral extremity of said service channel and the other of which is provided with a member which may be constituted by a screw-threaded member and which is in engagement with a recess provided in the core of the service column, whereby the clamping member securely embraces the column. Preferably the securement device also comprises a connection member which may be a screw-threaded connection member screw-threadedly mounted through an aperture in the securement device and by means of which connection of the securement device to the ceiling structure may be achieved. The securement device may be provided with a recess within which the ceiling structure is in engagement, an end of said screw-threaded connection member bearing against the ceiling structure disposed within the recess.

According to alternative embodiments of the invention the securement device may comprise a pair of clamping arms one end of each of which is in engagement with the core of the service column at a lateral extremity of said service channel, the other end portions of the clamping arms being securely interconnected for said secure embracing of the column by said arms. The securement device may further comprise a connection member which is connected to the clamping arms and which has a base, and two spaced limbs projecting outwardly from the base to the same side thereof, notches being provided in the lower edges of the limbs of the connection member thereof with the ceiling structure, in engagement with said notches, and the base of the connection member being urged in the direction away from the ceiling structure, whereby securely to connect the securement device to the ceiling structure. Such urging of the base of the connection member in the direction away from the ceiling structure may be means of a screw-threaded member which is screw threadedly engaged through an aperture in the base and an end of which bears against the ceiling structure.

Said other end portions of the clamping arms may be securely interconnected by means of a further screw-threaded member which is also screw-threadedly engaged with an aperture in one of the limbs of the connection member, thereby to provide said connection of said other end portions of the clamping arms thereto. The other limb of said connection member may be provided with a correspondingly located aperture so that said other end portions of the clamping arms may be connected to said other limb of the connection member.

Referring again to all the embodiments of the invention, the core of the service column is preferably in cross-section in the form of two members each of which is of approximately U-shaped in cross-section and which are disposed in back-to-back relationship with web portions of said members rigidly interconnected, although the core may be alternatively be of approximately X-shape in cross-section. The corners of the core have longitudinally extending, outwardly directed bead portions with which resiliently deformable, longitudinally extending side cover strips are removably engaged, with one of these side cover strips constituting the removable cover mounted on said open face of said service channel.

The service column preferably incorporates a floor supported base plate which is reversibly mounted on the core, the base plate representing on one main face thereof a plurality of outwardly projecting teeth and presenting on the opposed main face thereof a frictional surface.

In order that the present invention may be more clearly understood and more readily carried into effect the same will now, by way of example, be more fully described with reference to the accompanying drawings in which FIG. 1 is an isometric view of a service column as incorporated in a combination according to a preferred embodiment of the present invention, the column being shown operatively disposed between a ceiling and floor;

FIG. 7 is an isometric view showing the upper end portion of the service column and the securement device according to the embodiment of the invention shown in FIG. 1, this view also being drawn to an enlarged scale;

FIG. 8 is a view corresponding to FIG. 7, but showing the service column and securement device according to the alternative embodiment of the invention shown in FIG. 4;

FIG. 9 is an exploded isometric view of the lower end portion of the service column according to the embodiment of the invention shown in FIG. 4, but drawn to a reduced scale relative to FIG. 4; and FIG. 10 is a view corresponding to FIG. 9 but showing an element illustrated therein in a different operative orientation.

Figure 1:
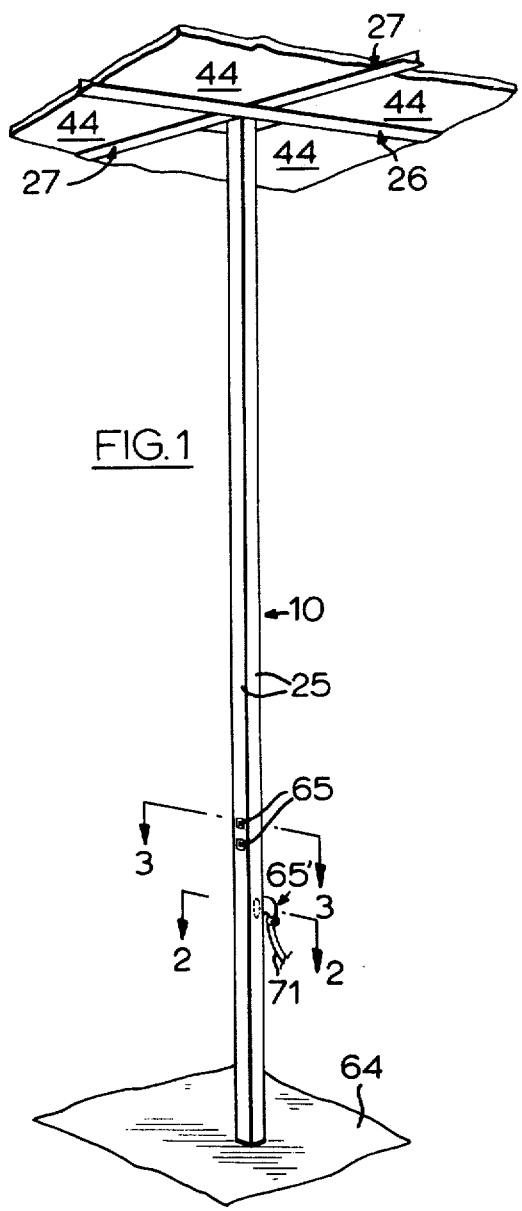

Referring to the accompanying drawings, 10 denotes generally a service column which comprises a core 11, this core 11 being constituted by a longitudinally extending metallic extrusion which is preferably of an aluminum alloy. With particular reference to the preferred embodiment of the invention which is shown in, for example, FIG. 2, the core 11 is in cross-section in the form of two approximately identical members 11' each of which is of approximately U-shape, and comprises two spaced opposed side portions 12 and a web portion 13, said members being disposed in back-to-back relationship with the web portions 13 of said members 11' rigidly interconnected and preferably integrally formed with one another so that the web portions 13 together constitute a single composite web portion 13'. A longitudinally extending recess 14 which in cross-section is in the form of a major segment of a circle, is provided in the core 11 at the junction of each side portion 12 of one of said members 11' with the adjacent side portion 12 of the other of said members 11'. For a purpose which is hereinafter more fully described, ribs 15 are presented by the web portion 13'. The longitudinally extending free edges of the side portions 12 present bead portions 16 which constitute the corners of the core 11 and each of which projects outwardly at an oblique angle. Inwardly directed retention ribs 17 the purpose of which is hereinafter more fully described are presented on the inner faces of the portions 12 adjacent to the bead portions 16.

Figure 4:
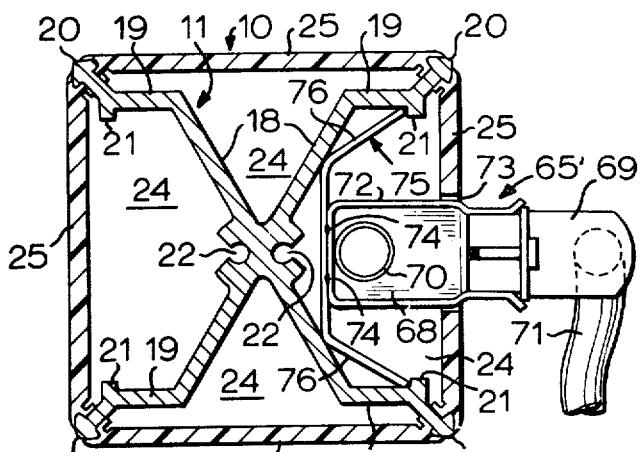
FIG. 4 is a view corresponding to FIG. 2 but showing a service column according to an alternative embodiment of the invention.

With particular reference to the alternative embodiment of the invention shown in, for example, FIG. 4, the core 11 is of approximately X-shape in cross-section and comprises intersecting portions 18, the longitudinally extending outer edges of which present projecting portions 19. These portions 19 are parallel to one another with the portions 19 presented by the edges of the portions 18 at one side of the core 11 being coplanar, and with the portions 19 presented by the edges of the portions 18 at the opposed side of the core 11 likewise being coplanar. Bead portions 20 which correspond to the bead portions 16 project outwardly at an oblique angle from the longitudinally extending outer edges of the portions 19, and inwardly directed retention ribs 21 which likewise correspond to the retention ribs 17 are presented on the inner faces of the portions 19 adjacent to the bead portions 20. Furthermore, longitudinally extending recesses 22 which are each in cross-section in the form of a major segment of a circle and which correspond in form to the recesses 14 are presented on two opposed sides of the intersection of the portions 18.

Figure 2:
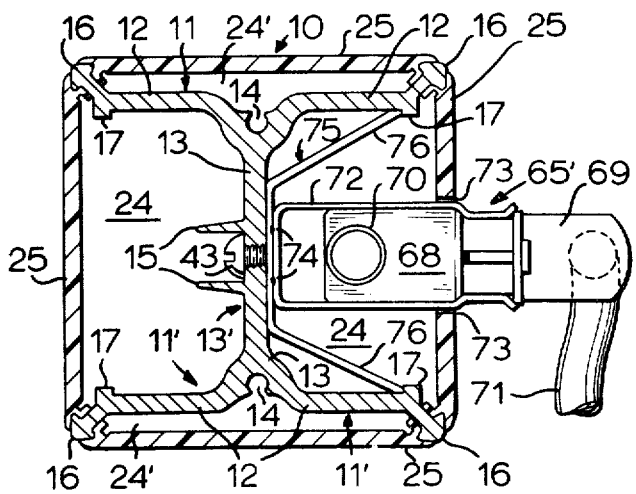
FIG. 2 is a cross-section view, drawn to an enlarged scale, on the line 2—2 of FIG. 1.
Figure 6:
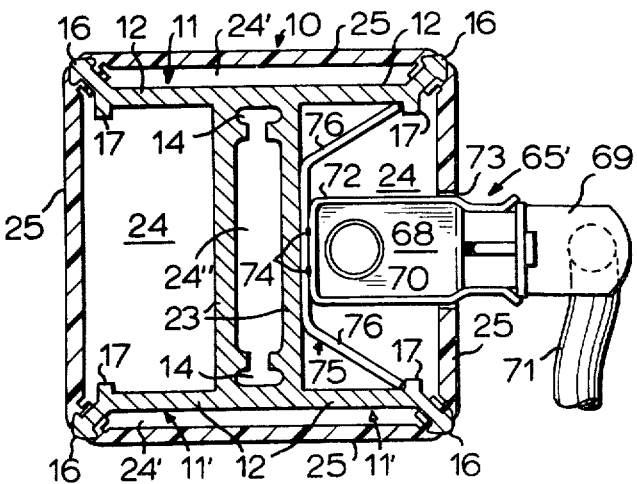
FIG. 6 is a further view corresponding to FIG. 2, but showing a service column according to a further alternative embodiment of the invention.

Referring now to the further alternative embodiment of the invention shown in FIG. 6, the core 11 as illustrated therein differs from the core 11 shown in FIG. 2 only in that in the embodiment shown in FIG. 6 there are two spaced parallel web portions 23 instead of the single composite web portins 13', and the recesses 14 are provided on the inner faces of the junctions of the side portions 12 between the web portions 23 instead of on the outer faces of the junctions of the side portions 12. Otherwise, the core 11 shown in FIG. 6 is substantially identical to the core 11 shown in FIG. 2, and like reference numerals have been used to denote like parts.

Referring again to all the embodiments of the invention as shown in the accompanying drawings, each of the cores 11 is thus provided with a plurality of longitudinally extending main service channels 24, each channel 24 having a longitudinally extending open face. In the embodiments of the invention shown in FIGS. 2 and 6 there are two such main service channels 24, while in the embodiment of the invention shown in FIG. 4 there are four such main service channels 24, the core 11 in each of the embodiments shown in FIGS. 2 and 6 being provided with two longitudinally extending secondary service channels 24' in addition to the two main service channels 24. The secondary service channels 24' likewise have longitudinally extending open faces but are of reduced depth relative to the main service channels 24. Each of the service channels 24 and 24' is provided with a removable side cover strip 25 which is constituted by a longitudinally extending, resiliently deformable side cover strip which is preferable formed of a plastics material, but which may alternatively be of a metal backed plastic material or of thin metal. The longitudinally extending side edges of each cover strip 25 are so formed as to be removably engageable with the bead portions 16 or 20 at the lateral extremities of the associated service channel 24 or 24' thereby to cover the open face of said associated service channel 24 or 24', operative rattling of the cover strips 25 when engaged with the bead portions 16 or 20 being substantially eliminated, particularly where the cover strips 25 are formed of a plastics material, so that this disadvantage of hitherto used service columns incorporating cover strips of metallic form is substantially obviated or mitigated.

As will be appreciated the colour and finish of the cover strips 25 in the service column 10 may be varied as desired by substituting cover strips 25 having different colours and finishes without thereby increasing the cost of the column 10. Such substitution of the cover strips may be performed while the column 10 is operatively installed. Furthermore, by providing each of the service channels 24, 24' with a cover strip 25 all the faces of the column 10 may have the same appearance in terms of the colour and finish thereof.

The space between the web portions 23 in the embodiment of the invention shown in FIG. 6 may serve as a further service channel 24" which does not, however, have a longitudinally extending open face corresponding to the longitudinally extending open face of each of the service channels 24, 24'.

Figure 7A:
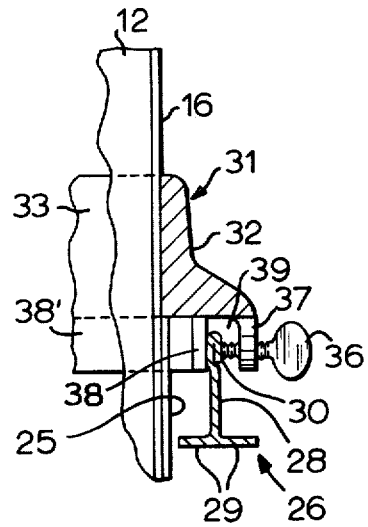
FIG. 7A is a sectioned view on the line 7A—7A in FIG. 7 showing part of the service column and securement device illustrated therein.

With particular reference to FIG. 1, there is therein illustrated a ceiling structure which comprises a false ceiling constituted by a grid of interconnected main beams, one of which is illustrated and denoted by the reference numeral 26, and cross beams, two of which are illustrated and denoted by the reference numeral 27. These beams 26 and 27, as is more clearly shown in FIGS. 7 and 8, are each of inverted, substantially T-shaped in cross-section, and each comprises a substantially vertical web 28 the lower edge of which presents oppositely directed side flanges 29 and the upper edge portion of which is reflexly bent as indicated by the reference numeral 30. In FIG. 7 the height of the main beams 26 is shown as being somewhat greater than the height of the cross beams 27, whereas in FIG. 8 the main beams 26 and the cross beams 27 are shown as being of substantially the same height.

In the embodiment illustrated in FIG. 7 there is provided a securement device which comprises a substantially U-shaped clamping member 31 by means of which the upper end portion of the column 10 is releasably mounted to said ceiling structure. The clamping member 31 comprises a web 32 and two substantially parallel opposed limbs 33 and 34, the free edge portion of the limb portion 33 being so formed as to be engage with the bead portion 16 at the longitudinally extending lateral extremity of one of the service channels 24, and the free edge portion of the limb 34 being provided with an aperture through which a screw-threaded member 35 is disposed. An end of this screw-threaded member 35 is operatively laterally engaged within the adjacent longitudinally extending recess 14, whereby the clamping member 31 securely embraces the core 11 transversely thereof.

The securement device which comprises the clamping member 31 also comprises a connection member which is constituted by a screw-threaded member 36, this connection member 36 being screw-threadedly mounted through an aperture provided in a downwardly directed lug 37 presented by the clamping member 31 for connection of the clamping member 31 to one of the main beams 26. Between the lug 37 and a depending skirt portion 38 of the clamping member 31 there is provided a recess 39 within which the reflexly bent upper edge portion 30 of the web 28 of the main beam 26 is operatively engaged as is most clearly shown in FIG. 7A, the inner end of the connection member 36 operatively bearing against the reflexly bent upper edge portion 30 of the web 28, and if desired partially compressing this reflexly bent upper edge portion 30, thereby securely to connect the clamping member 31 to the main beam 26.

The lug 37 is presented by the web 32 of the clamping member 31, but a corresponding lug (not shown) may also be presented in a like manner by the limb 33 of the member 31 with an aperture corresponding to the aperture in the lug 37 through which the connection member 36 is screw-threadedly mounted being provided in said corresponding lug and with a recess corresponding to the recess 39 being provided between said corresponding lug and a continuation 38' of the skirt portion 38 of the clamping member 31, so that the clamping member 31 may alternatively be securely connected to one of the main beams 26, or to one of the cross beams 27, with the limb 33 instead of the web 32 adjacent to appropriate beam 26 or 27. As is clearly shown in FIG. 7A the clamping member 31 is disposed immediately above the upper ends of the side cover strips 25 with the upper end portions of the appropriate strips 25 disposed inwardly of the skirt portion 38 and of the continuation 38' thereof.

42 denotes a generally U-shaped flat trim plate which is adapted, by slidable movement thereof in the direction of the arrow A in FIG. 7, to be disposed as shown in FIG. 7, below the clamping member 31 and around the sides of the column 10 other than the side thereof disposed adjacent to the main beam 26, with the plate 42 being supported on the appropriate side flanges 29 of the main beam 26 and of the adjacent cross beam 27, and with a ceiling panel 44 disposed above the trim plate 42. The appropriate corner portion of the ceiling panel 44 is, of course, broken away, but because of the use of the trim plate 42 this broken-away corner portion of the ceiling panel 44 may be relatively rough without detracting from the appearance as viewed from the office accommodation or the like below the false ceiling. The trim plate 42 has a relatively narrow leg portion (not shown in FIG. 7) and a wider leg portion 42', the narrow leg portion being disposed in supported relationship with the appropriate side flange 29 of the cross beam 27. If however, the column 10 is so disposed that the cross beam 27 is adjacent the opposite side of the column 10 the trim plate 42 may be used in an inverted condition so that the narrow leg portion thereof is still disposed in supported relationship with the appropriate side flange 29 of the cross beam 27.

Referring now to the alternative embodiment, shown in FIG. 8 it will be noted that the securement device comprises, instead of the clamping member 31, a pair of clamping arms 45 and 46, with the arm 45 disposed across two sides of the core 11 and with the arm 46 disposed across one of the remaining sides of the core 11, the arms 45 and 46 being so disposed immediately above the upper ends of the side cover strips 25. An end portion 47 of each of the arms 45 and 46 is reflexly bent and is in engagement with one of the bead portions 20 at the longitudinally extending lateral extremities of one of the service channels 24. The other end portions of the arms 45 and 46 are obliquely angled as indicated by the reference numeral 48, said other end portions 48 of the arms 45 and 46 being securely interconnected by a screw-threaded member 49 thereby to cause the arms 45 and 46 securely to embrace the core 11 transversely thereof. In this alternative embodiment shown in FIG. 8 the securement device also comprises a connection member 50 which has a base 51 and two spaced limbs 52 and 53 which project outwardly from the base 51 to the same side thereof. Notches 54 are provided in the lower edges of the limbs 52 and 53 with the reflexly bent upper edge portion 30 of the web 28 of one of the main beams 26 in engagement with these notches 54, and the base 51 is urged in the direction away from said main beam 26 by means of a screw-threaded member 55 which is screw-threadedly engaged through an aperture in the base 51 and an end of which bears against the reflexly bent upper edge portion 30 of the web 28. The connection member 50 is thereby securely connected to the main beam 26, and since the screw-threaded member 49 serves securely to connect the interconnected clamping arms 45 and 46 to the limp 52 of the connection member 50 the arms 45 and 46 are thereby securely connected to the main beam 26.

The limb 53 of the connection member 50 is provided with an aperture 56 which corresponds to the aperture provided in the limb 52 with which the screw-threaded member 49 is screw-threadedly engageable, thereby to permit the end portions 48 of the clamping arms 45 and 46 alternatively to be securely connected to the limb 53 of the connecting member 50.

This alternate embodiment shown in FIG. 8 also incorporates a trim plate 57 which corresponds in structure and function to the trim plate 42 as hereinbefore described with reference to FIG. 7.

Referring both to the preferred embodiment of the invention shown in FIG. 7 and to the alternative embodiment shown in FIG. 8, it will be noted that with the securement device comprising the clamping member 31 or the clamping arms 45 and 46 securely embracing the core 11 of the column 10 there is one of the service channels 24, 24' provided in the core 11 which is not overlied by the securement device, so that with the trim plate 42 or 57 manually removed the open face of said one of the service channels 24, 24' is not obstructed and cables or wiring may readily be "laid-in" into this service channel 24, 24' through the open face thereof, assuming of course that the associated cover strip 25 has also been removed. This operation does not require removal or adjustment of the securement device in any way.

Thus, it is not necessary for such cables or wiring to be fed-in to the said one of the service channels 24, 24' by a threading operation, with the result that the disadvantages as hereinbefore described of such a "threading" operation are obviated.

While in the embodiments of the present invention as hereinbefore specifically described with reference to the accompanying drawings only one of the service channels 24, 24' provided in the core 11 does not have the securement device overlying the open face thereof when the core 11 is securely clamped by the securement device, it will be understood that in a alternative embodiments (not shown) of the invention two or more of the service channels 24, 24' may have the open faces thereof not overlied by the securement device when the core 11 is securely clamped thereby. This could be achieved either by modifying the form of the clamping member 31 or of the clamping arms 45 and 46 comprising the securement device, or by modifying the cross-sectional form of the core 11, or of course by both such modifications. Furthermore, it is to be emphasised that by turning of the column 10 about its longitudinal axis the service channel or channels 24, 24' which do not have the securement device overlying the open face or faces thereof when the core 11 is securely clamped by the securement device may be changed. In addition, within the office accommodation or the like in which the service column 10 is operatively installed the direction in which the service channel 24 or 24', or each service channel 24, 24' which does not have the securement device overlying the open face thereof is directed may be changed by changing the location of the column 10 relative to the main and cross beams 26 and 27 and without disturbing the secure embracing of the core 11 by the securement device. Thus, for example, if with reference to FIG. 7 the clamping member 31 which is shown as being connected to the main beam 26 is disconnected therefrom and is instead connected in a corresponding manner to the cross beam 27 shown in this view it follows that there is a change of 90° in the direction in which the service channel 24 which does not have the securement device overlying the open face thereof is directed, since of course the cross beam 27 is at right angles to the main beam 26.

It is also to be emphasised that, with reference to both FIGS. 7 and 8, the securement device, prior to secure embracing thereby of the core 11, is longitudinally slidable relative to the core 11 so that the application to the ceiling structure comprising the main beams 26 and cross beams 27 of vertical loading when the column 10 is releasably mounted to the ceiling structure may be avoided.

As is most clearly shown in FIGS. 9 and 10 the service column 10 incorporates a floor supported base plate which is denoted generally by the reference number 59, and which has on one main face thereof a plurality of outwardly projecting metal teeth 60 and on the opposed main face thereof a frictional surface which may be presented by adhesively surfaced padding 61. The base plate 59 is adapted to be reversibly mounted on the core 11 by means of a plurality of screw-threaded members 62 which are disposed through apertures 63 provided in the base plate 59 and which screw-threadedly engage with the lower end portions of the recesses 22, the screw-threaded members 62 preferably being of the self-tapping type. Thus, the base plate 59 may be mounted on the core 11 with the teeth 60 projecting downwardly for secure engagement with a carpet 64 or the like (FIG. 1), or the base plate 59 may be mounted on the core 11 with the adhesively surfaced padding 61 directed downwardly for secure engagement with relatively smooth-surfaced flooring such as tile flooring.

In FIG. 1 there is illustrated two electrical power outlets 65 together with a telephone connection 65' of the multiple telephone type. The outlets 65 and the telephone connection 65' may be of conventional form.

Figure 5:
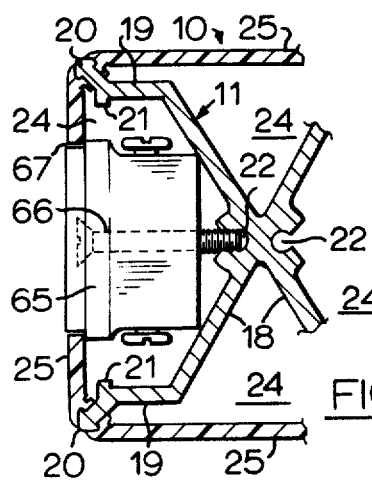
FIG. 5 is a cross-sectional part view corresponding to FIG. 3 but showing the service column according to the embodiment illustrated in FIG. 4, the view being drawn to the same enlarged scale as FIG. 4.
Figure 3:
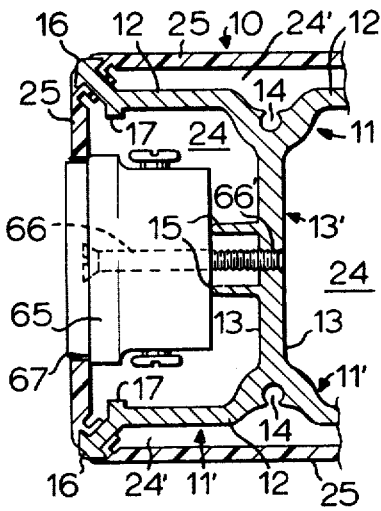
FIG. 3 is a cross-sectional part view drawn to the same enlarged scale as FIG. 2, on the line 3—3 of FIG. 1.

As is shown in FIG. 3 each of the electrical power outlets 65 is securely mounted at the desired position by a screw-threaded member 66 which is screw-threadedly engaged in a lateral direction with a hole 66' provided in the web portion 13', an appropriately positioned opening 67 being provided in the cover strip 25 in question for accommodating the outlet 65, and the outlet 65 being seated against the ribs 15 which thereby ensure that the outer face of the outlet 65 is substantially flush with the outer face of said strips 25. Referring to FIG. 5, the mounting of the outlet 65 as shown therein differs from the mounting of the outlet 65 as hereinbefore described with reference to FIG. 3 merely in that the screw-threaded member 66 is screw-threadedly engaged with the adjacent longitudinally extending recess 22 and the outlet is seated against the portions 18.

As it is most clearly shown in FIG. 2, 4, or 6, each of the telephone connections 65' comprises an inner portion 68 together with an outer portion 69 which is electrically connected to the inner portion 68, a cable 70 being connected to the inner portion 68 and a further cable 71 being connected at one end thereof to the outer portion 69 and at the other end to the telephone instrument (not shown). The inner portion 68 of the telephone connection 65' is mounted within a spring clip 72 which is disposed through an opening 73 in the appropriate cover strip 25, this spring clip 72 being secured as by welding 74 to a further spring clip 75 having limb portions 76 which are operatively urged apart so that the free ends thereof may engage with the appropriate retention ribs 17 or 21 thereby securely to retain the telephone connection 65' accurately at the desired position.

With particular reference to FIG. 2, 43 denotes a grounding screw which is screw-threadedly engaged with a hole provided in the web portion 13', a ground wire (not shown) being operatively disposed under the head of the grounding screw 43 which is disposed between the ribs 15 so that the ribs 15 serve substantially to prevent accidental removal of the ground wire from under the head of the screw 43.

It will, of course, be understood that although the features of the present invention have been described with reference to particular embodiments of the invention many of these features may be incorporated in embodiments other than those in association with which they are hereinbefore specifically described. Thus for example, the form of the securement device as shown in FIG. 7 and which comprises the clamping member 31 may, of course, be used in association with a service column 10 in which the core 11 is of the cross-sectional form shown in FIg. 4, or in association with a service column 10 in which the core 11 is of the cross-sectional form shown in FIG. 6. Conversely, the form of the securement device as shown in FIG. 8 and which comprises the clamping arms 45 and 46 may be used in association with a service column 10 in which the core 11 is of the cross-sectional form shown in FIG. 2, or in association with a service column 10 in which core 11 is of the cross-sectional form shown in FIG. 6.

Likewise, for example, the base plate 59 may be used in association with a service column 10 in which the core 11 is of the cross-sectional form shown in FIG. 2, or in association with a service column 10 in which the core 11 is of the cross-sectional form shown in FIG. 6, although this would, of course, necessitate appropriate relocation of the aperture 63.

What I claim as my invention is:

1. In combination, a service column, a ceiling structure, and a securement device releasably mounting the service column to the ceiling structure, wherein the service column comprises a core provided with a longitudinally extending service channel having a longitudinally extending open face, and a removable cover mounted on said open face, and the securement device securely embraces the column transversely thereof without overlying said service channel, the securement device being connected to the ceiling structure.

2. A combination according to claim 1, wherein a recess is provided in the core of the service column, and the securement device comprises a substantially U-shaped clamping member having two spaced limbs the free end portion of one of which is in engagement with the core of the service column at a lateral extremity of said service channel and the other of which is provided with a member which is in engagement with said recess provided in the core of the service column, whereby the clamping member securely embraces the column transversely thereof, the securement device also comprising a connection member connecting the securement device to the ceiling structure.

3. A combination according to claim 2, wherein said member which is in engagement with said recess provided in the core of the service column is constituted by a screw-threaded member.

4. A combination according to claim 2, wherein said connection member comprises a screw-threaded connection member screw-threadedly mounted through an aperture in the securement device.

5. A combination according to claim 2, wherein a recess within which the ceiling structure is in engagement is provided in the securement device, said connection member being in engagement against the ceiling structure.

6. A combination according to claim 1, wherein the securement device comprises a pair of clamping arms one end of each of which is in engagement with the core of the service column at a lateral extremity of said service channel, the other end portions of the clamping arms being securely interconnected to provide said secure embracing of the column by said arms.

7. A combination according to claim 6, wherein the securement device further comprises a connection member which is connected to the clamping arms and which has a base, and two spaced limbs projecting outwardly from the base to the same side therof, notches being provided in the lower edges of the limbs of the connection member with the ceiling structure in engagement with said notches, and the base of the connection member being urged in the direction away from the ceiling structure, whereby securely to connect the securement device to the ceiling structure.

8. A combination according to claim 7, wherein there is provided a screw-threaded member which is screw threadedly engaged through an aperture in the base of the connection member and an end of which bears against the ceiling structure to provide said urging of the base of the connection member in the direction away from the ceiling structure to which the securement device is securely connected.

9. A combination according to claim 7, wherein there is provided a screw-threaded member securely interconnecting said other end portions of the clamping arms, said screw-threaded member being also in screw-threaded engagement with an aperture in one of the limbs of the connection member, thereby to provide said connection of said other end portions of the clamping arms thereto.

10. A combination according to claim 9, wherein the other limb of the connection member is provided with a correspondingly located aperture so that said other end portions of the clamping arms may be connected to said other limb of the connection member.

11. A combination according to claim 1, wherein the core of the service column is in cross-section in the form of two members each of which is of approximately U-shape in cross-section and which are disposed in back-to-back relationship with web portions of said members rigidly interconnected.

12. A combination according to claim 1, wherein the core of the service column is of approximately X-shape in cross-section.

13. A combination according to claim 1, wherein the core of the service column has longitudinally extending corners which present longitudinally extending, outwardly directed bead portions, resiliently deformable, longitudinally extending side cover strips being removably engaged with said bead portions, with one of said side cover strips constituting the removable cover mounted on said open face of said service channel.

14. A combination according to claim 1, wherein the service column incorporates a floor supported base plate which is reversibly mounted on the core, the base plate presenting on one main face thereof a plurality of outwardly projecting teeth and presenting on the opposed main face thereof a frictional surface.

* * * * *